(12) United States Patent
Batarseh

(10) Patent No.: US 11,821,276 B2
(45) Date of Patent: Nov. 21, 2023

(54) LASER MILLING AND REMOVAL TOOL AND METHODS

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/530,162

(22) Filed: Nov. 18, 2021

(65) Prior Publication Data

US 2023/0151707 A1    May 18, 2023

(51) Int. Cl.
| | | |
|---|---|---|
| *E21B 29/02* | (2006.01) | |
| *B23K 26/38* | (2014.01) | |
| *B23K 26/08* | (2014.01) | |
| *E21B 7/15* | (2006.01) | |
| *E21B 47/09* | (2012.01) | |

(Continued)

(52) U.S. Cl.
CPC .......... *E21B 29/02* (2013.01); *B23K 26/0876* (2013.01); *B23K 26/38* (2013.01); *E21B 7/15* (2013.01); *E21B 31/00* (2013.01); *E21B 47/09* (2013.01); *B23K 26/0648* (2013.01)

(58) Field of Classification Search
CPC . E21B 7/15; E21B 29/02; E21B 47/09; B23K 26/0648; B23K 26/0876; B23K 26/38
See application file for complete search history.

(56) References Cited

U.S. PATENT DOCUMENTS

| | | | |
|---|---|---|---|
| 6,755,262 B2 | 1/2004 | Parker | |
| 6,880,646 B2 * | 4/2005 | Batarseh | ................. E21B 43/11 166/57 |
| 6,888,097 B2 | 5/2005 | Batarseh | |

(Continued)

FOREIGN PATENT DOCUMENTS

| | | |
|---|---|---|
| CN | 203081295 U | 7/2013 |
| CN | 203334954 U | 12/2013 |

(Continued)

OTHER PUBLICATIONS

Workover & Completion, Foro Energy, https://www.foroenergy.com/workover-completion, Nov. 18, 2021.

(Continued)

*Primary Examiner* — Jennifer H Gay
(74) *Attorney, Agent, or Firm* — Bracewell LLP; Constance G. Rhebergen; Keith R. Derrington

(57) ABSTRACT

Systems and methods for cutting objects within a subterranean well include a laser system having a laser drilling head located at a terminal downhole end of a laser tool body directing a head laser beam in a direction downhole. A laser scanner assembly located within the laser tool body has a scanner head directing a scanner laser beam and can move both axially along a length of the laser tool body and rotate around a central axis of the laser tool body. A laser cutter assembly located within the laser tool body has a cutter head directing a cutter laser beam and can rotate around the central axis of the laser tool body. A cable bundle formed of a plurality of fiber optic cables extends from an uphole end of the laser tool body to each of the laser drilling head, the laser scanner assembly, and the laser cutter assembly.

24 Claims, 5 Drawing Sheets

(51) Int. Cl.
*B23K 26/06* (2014.01)
*E21B 31/00* (2006.01)

(56) References Cited

U.S. PATENT DOCUMENTS

| | | | |
|---|---|---|---|
| 8,074,332 B2 | 12/2011 | Keatch et al. | |
| 8,307,900 B2 | 11/2012 | Lynde et al. | |
| 8,678,087 B2 | 3/2014 | Schultz et al. | |
| 9,492,885 B2 | 11/2016 | Zediker et al. | |
| 9,677,339 B2* | 6/2017 | Linetskiy | E21B 43/2401 |
| 9,903,171 B2* | 2/2018 | Linetskiy | E21B 43/11 |
| 10,415,338 B2* | 9/2019 | Batarseh | G02B 19/0009 |
| 10,883,359 B2 | 1/2021 | Stokes et al. | |
| 10,968,704 B2* | 4/2021 | Batarseh | B23K 26/38 |
| 2004/0206505 A1* | 10/2004 | Batarseh | E21B 43/24 166/302 |
| 2012/0074110 A1* | 3/2012 | Zediker | E21B 10/60 219/121.72 |
| 2013/0228372 A1* | 9/2013 | Linyaev | E21B 7/15 175/16 |
| 2014/0090846 A1* | 4/2014 | Deutch | E21B 33/13 166/376 |
| 2014/0182933 A1* | 7/2014 | Skinner | B23K 26/082 175/16 |
| 2017/0275960 A1* | 9/2017 | Linetskiy | E21B 47/135 |
| 2017/0321486 A1* | 11/2017 | Faircloth | E21B 7/15 |
| 2018/0266183 A1* | 9/2018 | Ayub | E21B 10/32 |
| 2019/0032434 A1* | 1/2019 | Batarseh | E21B 43/119 |
| 2019/0257156 A1* | 8/2019 | Batarseh | B23K 26/38 |
| 2019/0353032 A1* | 11/2019 | Batarseh | E21B 43/11 |
| 2020/0048966 A1* | 2/2020 | Batarseh | E21B 7/14 |
| 2020/0131854 A1* | 4/2020 | Batarseh | E21B 7/06 |
| 2021/0162545 A1* | 6/2021 | Faircloth | B23K 26/1476 |

FOREIGN PATENT DOCUMENTS

| | | |
|---|---|---|
| EP | 2990591 A1 | 3/2016 |
| WO | 2015088553 A1 | 6/2015 |
| WO | 2020178577 A1 | 9/2020 |

OTHER PUBLICATIONS

Laser Pipe Cutter, Zerlux Hungary Ltd., available at: https://www.zerluxhungary.com/laser-pipe-cutter, Aug. 26, 2021.

* cited by examiner

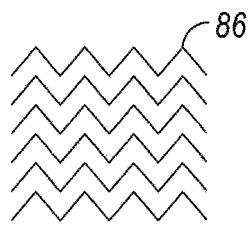 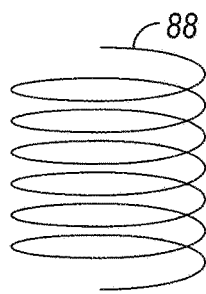 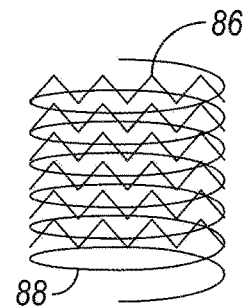
FIG. 7A  FIG. 8A  FIG. 9A
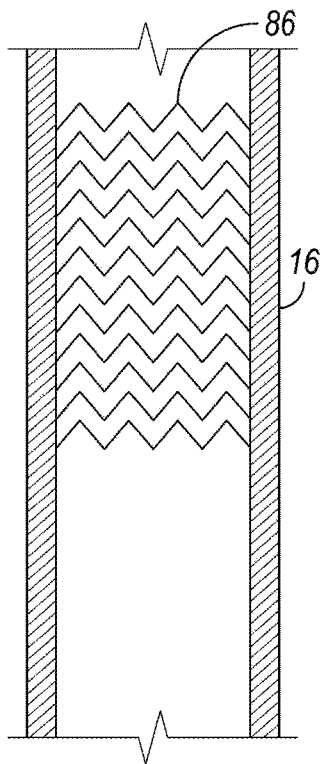 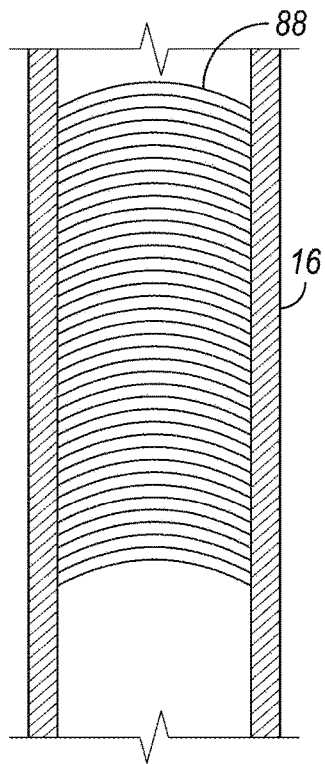 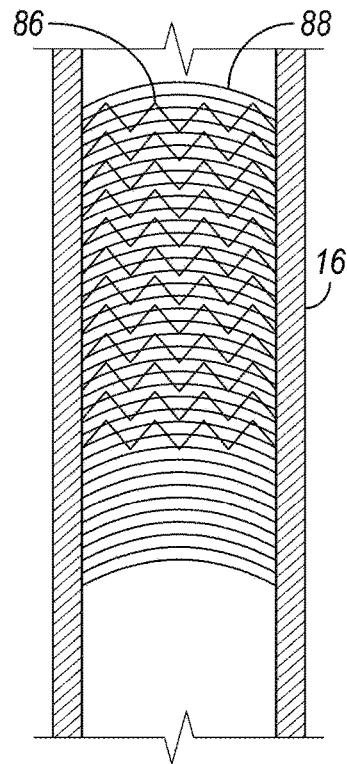
FIG. 7B  FIG. 8B  FIG. 9B

LASER MILLING AND REMOVAL TOOL AND METHODS

BACKGROUND OF THE DISCLOSURE

1. Field of the Disclosure

The disclosure relates generally to drilling and completion of a subterranean well, and more particularly to tools and methods related to the use of lasers in downhole applications.

2. Description of the Related Art

During conventional drilling of a subterranean well, a mechanical drill bit is used to drill into the formation in sections and the well section can then be cased with steel pipe. The steel pipes of the casing can be cemented into place. The creation of holes or windows in the casing after the casing has been installed in the wellbore can be achieved with mechanical tools such as milling tools which grind through the metal tubular members. Milling the casing can involve cutting a window through the side of the casing or to remove a continuous section of the casing so that the wellbore may be deviated from the original well through the window or section removed.

In addition, there may be times during the drilling, completion, or operation of the subterranean well that items are lost within the wellbore. Such items are commonly called fish or junk. The items can be, for example, junk metal, tools, parts or pieces of drill pipe or drill collars, drilling components, or other components used within the subterranean well. The item that is accidentally dropped or left within the wellbore can fall to the bottom of the wellbore or become jammed within the wellbore, blocking the wellbore or damaging the tubular members. Such fish can currently be mechanically removed with a milling tool, such as a tool that grinds the fish into smaller pieces to be removed from the wellbore. As an example, a fluid flow within the wellbore can remove the milled material from the wellbore.

SUMMARY OF THE DISCLOSURE

Mechanical means to mill objects in a wellbore and create holes and windows in casing can be time consuming and inaccurate. Embodiments of this disclosure provide systems and methods for removing a target material in the wellbore or grinding away a target portion of the casing by cutting the target in small parts. The tool operates in three actions: circular cutting; using side rotational lenses; longitudinal cutting using scanner optics; and laser head drilling to remove stuck material in the well bore. Systems and method of this disclosure utilize a laser that can provide precise and reliable material removal.

In an embodiment of this disclosure, a laser system for cutting objects within a subterranean well having a longitudinal axis includes a laser drilling head located at a terminal downhole end of a laser tool body. The laser drilling head is operable to direct a head laser beam in a direction downhole of the laser tool body. A laser scanner assembly is located within the laser tool body uphole of the laser drilling head. The laser scanner assembly has a scanner head operable to direct a scanner laser beam and to move both axially along a length of the laser tool body and rotate around a central axis of the laser tool body. A laser cutter assembly is located within the laser tool body uphole of the laser drilling head. The laser cutter assembly has a cutter head operable to direct a cutter laser beam and to rotate around the central axis of the laser tool body. A cable bundle is formed of a plurality of fiber optic cables extending from an uphole end of the laser tool body to each of the laser drilling head, the laser scanner assembly, and the laser cutter assembly.

In alternate embodiments, the laser scanner assembly can include an axial support, where the scanner head is moveable along the axial support. The scanner head can be rotatable relative to the axial support in an axial direction. The laser scanner assembly can be operable to direct the scanner laser beam in a zigzag pattern along an internal surface of the subterranean well. The laser cutter assembly can include a support ring and one of the plurality of fiber optic cables can extend from the cable bundle to the support ring.

In other alternate embodiments, the laser cutter assembly can include a cutter lens operable to direct the cutter laser beam from one of the plurality of fiber optic cables. The laser cutter assembly can be operable to direct the cutter laser beam in a circumferential pattern along an internal surface of the subterranean well. The laser cutter assembly can be operable to direct the cutter laser beam in a helical pattern along an internal surface of the subterranean well as the laser tool body is moved longitudinally within the wellbore.

In yet other alternate embodiments, the system can further include an orientation member, the orientation member operable to confirm the orientation of the laser system within the subterranean well. The system can alternately include a logging tool, the logging tool operable to confirm the axial location of the laser tool body within the subterranean well. The system can alternately include a joint located uphole of the laser drilling head, and downhole of both the laser scanner assembly and the laser cutter assembly. The system can further include a packer located radially exterior of the laser tool body, the packer selectively extendable to position the laser tool body within the subterranean well.

In an alternate embodiment of this disclosure, a method for cutting objects within a subterranean well having a longitudinal axis includes lowering a laser system into the subterranean well. The laser system has a laser drilling head located at a terminal downhole end of a laser tool body. A laser scanner assembly is located within the laser tool body uphole of the laser drilling head. A laser cutter assembly is located within the laser tool body uphole of the laser drilling head. A cable bundle is formed of a plurality of fiber optic cables extending from an uphole end of the laser tool body to each of the laser drilling head, the laser scanner assembly, and the laser cutter assembly. The method further includes directing a head laser beam in a direction downhole of the laser tool body with the laser drilling head. A scanner laser beam is directed with a scanner head of the laser scanner assembly, the laser scanner assembly moveable both axially along a length of the laser tool body and rotationally around a central axis of the laser tool body. A cutter laser beam is directed with a cutter head of the laser cutter assembly, the laser cutter assembly rotatable around the central axis of the laser tool body.

In alternate embodiments, the laser scanner assembly can include an axial support, and the method can further include moving the scanner head along the axial support. The scanner head can rotate relative to the axial support in an axial direction. The laser scanner assembly can direct the scanner laser bean in a zigzag pattern along an internal surface of the subterranean well.

In other alternate embodiments, the laser cutter assembly includes a support ring, and the method can further include extending one of the plurality of fiber optic cables from the cable bundle, to the support ring. The laser cutter assembly can include a cutter lens, and the method can further include directing the cutter laser beam from one of the plurality of fiber optic cables with the cutter lens. The laser cutter assembly can direct the cutter laser beam in a circumferential pattern along an internal surface of the subterranean well. Alternately, the laser cutter assembly can direct the cutter laser beam in a helical pattern along an internal surface of the subterranean well as the laser tool body is moved longitudinally within the wellbore.

In yet other alternate embodiments, the laser system can further include an orientation member, and the method can further include confirming the orientation of the laser system within the subterranean well with the orientation member. The laser system can further include a logging tool, and the method can further include confirming the axial location of the laser tool body within the subterranean well with the logging tool. The laser system can further include a joint located uphole of the laser drilling head, and downhole of both the laser scanner assembly and the laser cutter assembly. The laser system can further include a packer located radially exterior of the laser tool body, and the method can further include extending the packer to position the laser tool body within the subterranean well.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

FIG. 7A is a schematic representation of a zigzag pattern of a laser scanner assembly of a laser system, in accordance with an embodiment of this disclosure.

FIG. 7B is a schematic section elevation view of a zigzag pattern of a laser scanner assembly of a laser system cut into casing of a subterranean well, in accordance with an embodiment of this disclosure.

FIG. 8A is a schematic representation of a helical pattern of a laser cutter assembly of a laser system, in accordance with an embodiment of this disclosure.

FIG. 8B is a schematic section elevation view of a helical pattern of a laser cutter assembly of a laser system cut into casing of a subterranean well, in accordance with an embodiment of this disclosure FIG. 9A is a schematic representation of the helical pattern of a laser cutter assembly of a laser system superimposed over the zigzag pattern of a laser scanner assembly of a laser system, in accordance with an embodiment of this disclosure.

FIG. 9B is a schematic section elevation view of the helical pattern of a laser cutter assembly of a laser system superimposed over the zigzag pattern of a laser scanner assembly of a laser system cut into casing of a subterranean well, in accordance with an embodiment of this disclosure.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
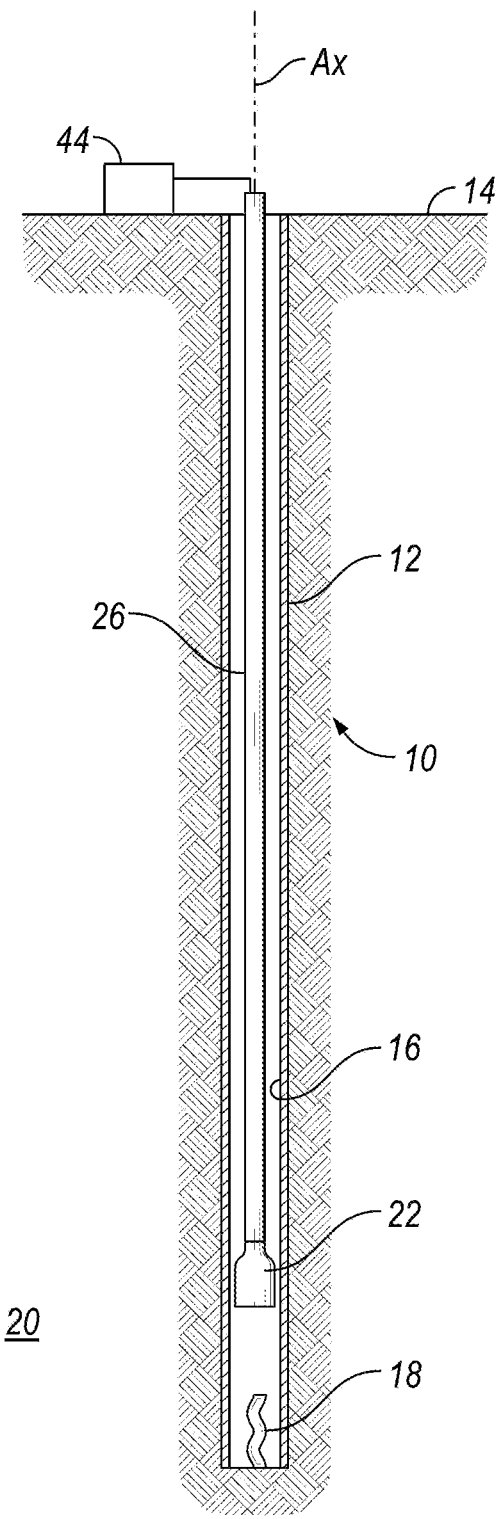
FIG. 1 is a schematic partial section elevation view of a subterranean well having a laser system, in accordance with an embodiment of this disclosure.

Referring to FIG. 1, subterranean well 10 can have wellbore 12 that extends from an earth's surface 14. Subterranean well 10 can be an offshore well or a land based well and can be a well associated with hydrocarbon development operations, such as, for example, a hydrocarbon production well, an injection well, or a water well. Wellbore 12 can be drilled from surface 14 and into and through various subterranean formations. Subterranean well 10 can have a longitudinal axis, Ax. In the example embodiment of FIG. 1, subterranean well 10 is shown as extending generally vertically from surface 14. In alternate embodiments, subterranean well 10 can have a wellbore 12 that is not generally vertical relative to surface 14, such as an inclined, deviation, horizontal wellbore.

Casing 16 can line an inner diameter surface of wellbore 12. Casing 16 can be formed of a series of tubular pipe joints that are secured end to end. Casing 16 can be a tubular member that has a bore.

There may be times during the development or operation of subterranean well 10 that a component 18 is lost within wellbore 12. Such components 18 are commonly called fish or junk. Component 18 can be, for example, junk metal, tools, parts or pieces of drill pipe or drill collars, drilling components, or other components used within the subterranean well 10. Component 18 that is accidentally dropped or left within wellbore 12 can fall to the bottom of wellbore 12.

There may alternately be times during the development or operation of subterranean well 10 that there are blockages or obstructions within wellbore 12, or damage to tubular members or equipment within wellbore 12. The obstructions can be caused, for example, by a component 18 being stuck or jammed within wellbore 12. Looking at FIG. 1, component 18 is shown generically as an item that has been lost within wellbore 12, as an item that is blocking or obstructing wellbore 12, or as a damaged feature of wellbore 12.

In other alternate times, an operator may wish to cut through casing 16 or another tubular member within wellbore 12. As an example, the operator may want to cut a window through the side of casing 16 or to remove a continuous section of casing 16 so that the wellbore may be deviated from the original well through the window or section removed.

Figure 2:
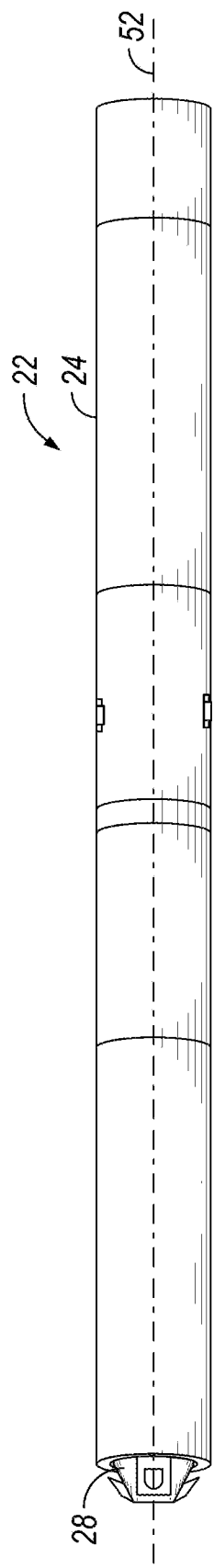
FIG. 2 is a perspective view of a laser system, in accordance with an embodiment of this disclosure.

Laser system 22 can be used to cut component 18 or a portion of casing 16 into pieces of a size that can be removed from wellbore 12. Looking at FIGS. 2-3, laser system 22 includes laser tool body 24. Laser tool body 24 is a generally tubular shaped member. Laser tool body 24 surrounds and contains features of the laser tool body 24. Laser tool body 24 can be secured to a delivery member 26 (FIG. 1), such as a wireline, e-line, drill string, or other tubular member.

Figure 3:
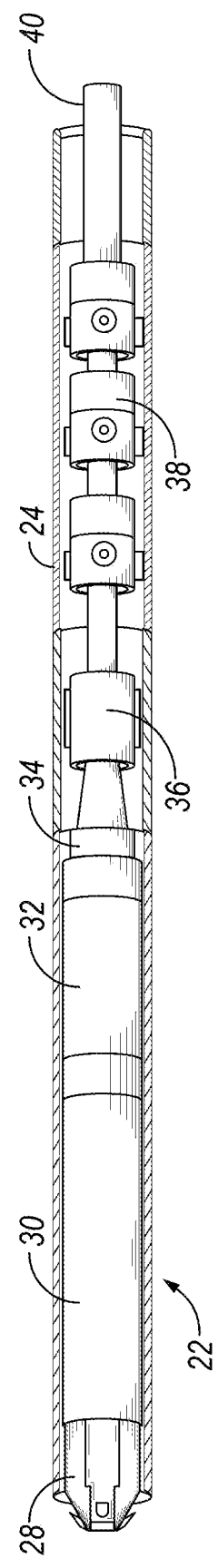
FIG. 3 is a section view of the laser system of FIG. 2.

Looking at FIG. 3, laser drilling head 28 is located at a terminal downhole end of laser tool body 24. Orientation member 30 is located uphole of laser drilling head 28. Logging tool 32 is also positioned uphole of laser drilling head 28. Orientation member 30 and logging tool 32 are also located within laser tool body 24. Laser drilling head 28, orientation member 30 and logging tool 32 together form a downhole assembly of laser system 22. Joint 34 is secured to an uphole end of the downhole assembly of laser system 22, securing the downhole assembly of laser system 22 to an uphole assembly of laser system 22.

Uphole assembly of laser system 22 includes laser scanner assembly 36 and laser cutter assembly 38. Each of laser scanner assembly 36 and laser cutter assembly 38 are also located within laser tool body 24. Each of laser scanner assembly 36 and laser cutter assembly 38 are also located within laser tool body 24. Laser drilling head 28, laser system 22, and laser cutter assembly 38 are secured in line. Cable bundle 40 extends from within laser tool body 24 and out an uphole end of laser tool body 24. Cable bundle 40 is formed of a plurality of fiber optic cables that extend from an uphole end of laser tool body 24 to each of laser drilling head 28, laser scanner assembly 36, and laser cutter assembly 38.

Figure 4:
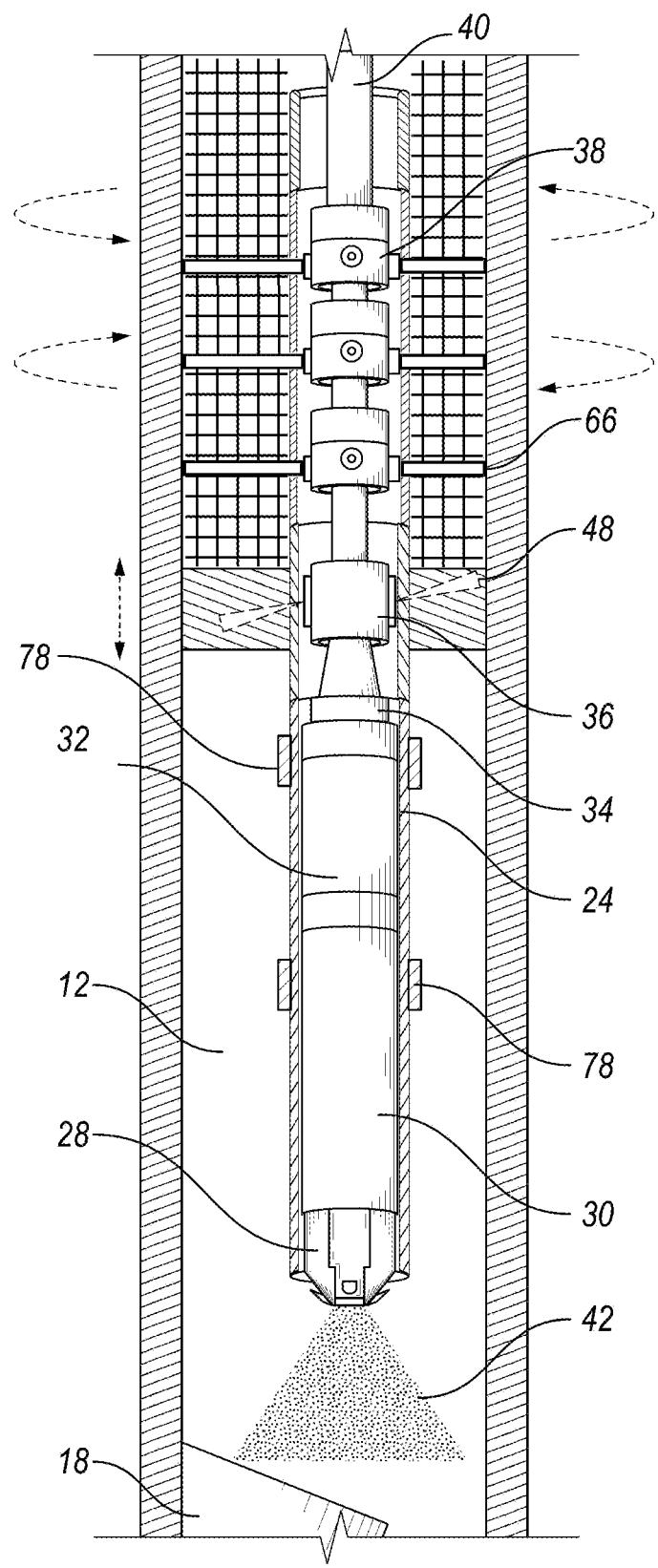
FIG. 4 is a detailed section elevation view of a subterranean well having a laser system, in accordance with an embodiment of this disclosure.

Looking at FIG. 4, laser drilling head 28 can direct head laser beam 42 beam in a direction downhole of the laser tool body. Head laser beam 42 can be used to penetrate into component 18 that is stuck in wellbore 12. Laser energy is generated by the generator at the surface by laser generator 44 (FIG. 1) and a primary laser beam is delivered by way of cable bundle 40 to laser system 22. Laser generator 44 can generate a high powered laser beam that can drill into and through different materials including steel, alloy, cement and rocks. Because laser generator 44 can generate a laser beam that can cut and drill through steel, alloy, cement or rocks, embodiments of this application can therefore successfully cut into and through such materials as well as other materials having a similar range of stress or strength.

Optics of laser drilling head 28 can be used to direct the primary laser beam to form head laser beam 42 and direct head laser beam 42 towards component 18. The primary laser beam used to form head laser beam 42 can have a power of at least 5 kW and be a continuous laser beams that is delivered by fiber optics.

Orientation member 30 can confirm the orientation of laser system 22 within subterranean well 10. Orientation member 30 can, for example, determine the alignment of laser system 22 relative to a target location. Such alignment determination may include an axial distance of laser system 22 from a target or a relative distance or radial positioning of laser drilling head 28, laser scanner assembly 36, or laser cutter assembly 38 from a target. The target may be, for example, a component 18 or a location along casing 16 where an operator desires to remove casing material. The orientation of laser system 22 can be accomplished by presetting laser system 22 on the surface or by manipulating laser system 22 downhole. The orientation of laser system 22 can be adjusted by an electric motor that can rotate laser system 22 in the direction desired.

Logging tool 32 can be used to gather information relating to the position of laser tool body 24 within subterranean well 10. As an example, logging tool 32 can gather information as laser system 22 travels within subterranean well 10 that can be used to determine the axial location of laser tool body 24 within subterranean well 10. Logging tool 32 can be a sonic, resistivity, gamma ray, density, or other known type of logging instrument.

Joint 34 is located uphole of laser drilling head 28, and downhole of both laser scanner assembly 36 and laser cutter assembly 38. In an example embodiment, joint 34 is secured between logging tool 32 and laser scanner assembly 36. Joint 34 can be used when servicing laser system 22. As an example, laser system 22 can be disassembled at joint 34 to isolate a portion of laser system 22 to be repaired or replaced.

Laser scanner assembly 36 is located uphole of both laser drilling head and joint 34. Looking at FIG. 5, laser scanner assembly 36 includes scanner head 46. Scanner head 46 can direct scanner laser beam 48.

Scanner head 46 can receive a primary laser beam that is delivered by way of cable bundle 40 to laser scanner assembly 36. Scanner primary laser beam 50 can extend in a direction that is generally parallel to central axis 52 (FIG. 1) of laser tool body 24. Scanner head 46 can be positioned to change the direction of scanner primary laser beam 50 so that the scanner laser beam 48 is directed radially outward.

Figure 5:
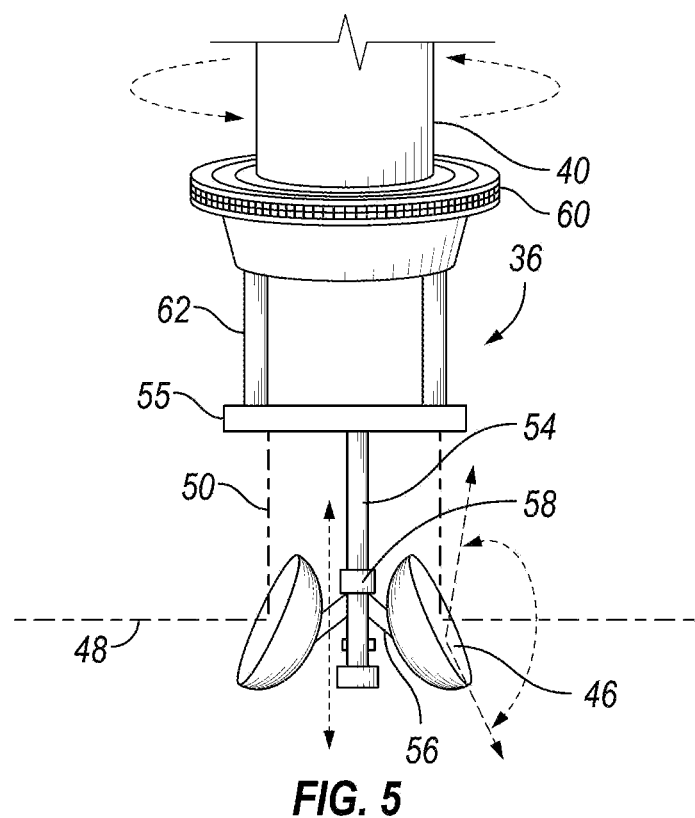
FIG. 5 is a detailed perspective view of a laser scanner assembly of a laser system, in accordance with an embodiment of this disclosure.

As scanner head 46 directs scanner laser beam 48. Scanner head 46 is a reflector that can move in a circular direction. Scanner head 46 can also move either axially along a length of laser tool body 24 or rotate around central axis 52 of laser tool body 24. As shown in FIG. 5, in an example embodiment, laser scanner assembly 36 includes axial support 54. Scanner head 46 can move axially along a length of laser tool body 24 by moving along axial support 54.

Axial support 54 can be an elongated member extending in a downhole direction from a support plate 55 of laser scanner assembly 36. Support plate 55 can stabilize laser scanner assembly 36, prevent vibration of laser scanner assembly 36 to ensure a quality consistent and stable laser beam. Support plate 55 can be a ring or disk shaped member centered around central axis 52. Support plate 55 can include optics that release the size, shape, and focus scanner primary laser beam 50 from scanner fiber optic cables 62.

Scanner head 46 indirectly engages axial support 54 through brace member 56 and ring member 58. Ring member 58 circumscribes axial support 54 and can slide axially along axial support 45. Brace member 56 extends from ring member 58 to scanner head 46. Scanner head 46 can rotate relative to axial support 54 in an axial direction. That is, scanner head 46 can pivot in a manner that causes the scanner laser beam to be directed from an uphole direction to a downhole direction along an axially oriented plane. Both the movement of scanner head 46 along axial support 54 and the rotation of scanner head 46 in the axial direction will allow laser scanner assembly 36 to make axial cuts into a component 18, casing 16, or other internal surface of subterranean well 10.

Laser scanner assembly 36 further includes scanner rotation coupling 60. Rotation coupling 60 provides for rotation of scanner head 46 about central axis 52 of laser tool body 24. Scanner head 46 can rotate in either or both of a clockwise or counter clockwise direction around central axis 52.

In FIG. 5, two scanner heads 46 are shown. In alternate embodiments, there may be one scanner head 46 or more than two scanner heads 46. The number of scanner heads 46 can be determined by the volume of material to be milled, and the depth to which the material is to be cut.

Cable bundle 40 contains a plurality of fiber optic cables. Each scanner head 46 will be delivered a separate scanner primary laser beam 50 by way of one of the scanner fiber optic cables 62 from the plurality of fiber optic cables of cable bundle 40. Scanner fiber optic cables 62 can extend to the support plate of laser scanner assembly 36. Other of the fiber optic cables will continue past laser scanner assembly 36 to reach laser drilling head 28. Such other fiber optic cables are not shown in FIG. 5.

As scanner head 46 is rotated about central axis 52 of laser tool body 24, scanner head 46 can also move axially along axial support 54, or can rotate in the axial direction, or both. Such rotation and axial movement will allow laser scanner assembly 36 to make zigzag cuts into a component 18, casing 16, or other internal surface of subterranean well 10.

Figure 6:
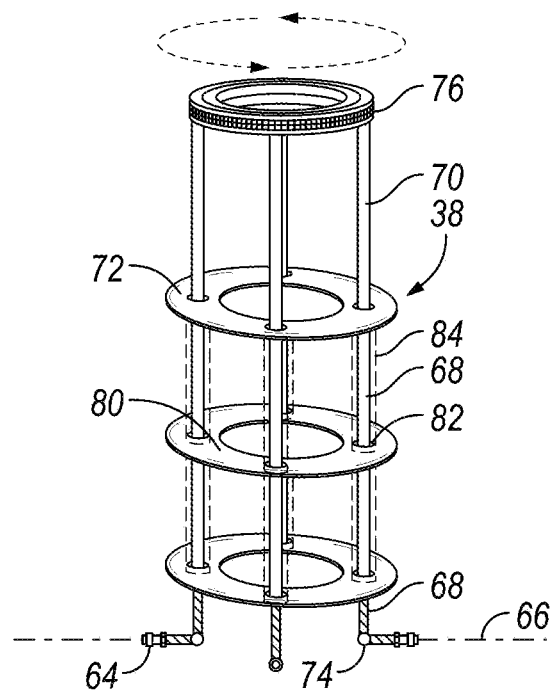
FIG. 6 is a detailed perspective view of a laser cutter assembly of a laser system, in accordance with an embodiment of this disclosure.

Looking at FIG. 4, laser cutter assembly 38 is located uphole of laser drilling head 28. Looking at FIG. 6, laser cutter assembly includes cutter head 64. In the embodiment of FIG. 6, there are four cutter heads 64. In alternate embodiments there could be one to three cutter heads 64, or more than four cutter heads 64. The number of cutter heads 64 can be determined by the volume of material to be milled, and the depth to which the material is to be cut.

Cutter head 64 directs cutter laser beam 66. Cutter head 64 can receive a primary laser beam that is delivered by way of one of the plurality of fiber optic cables of cable bundle 40 to laser cutter assembly 38. The primary laser beam can provide a beam that can be split between head laser beam 42 and cutter laser beam 66. Alternately, the primary laser beam can sequentially generate head laser beam 42 and cutter laser beam 66.

Each cutter head 64 will be delivered a separate cutter primary laser beam 68. Cutter primary laser beam 68 can extend in a direction that is generally parallel to central axis 52 (FIG. 1) of laser tool body 24. Laser cutter assembly 38 includes cutter lens 74. Cutter lens 74 s positioned to change the direction of cutter primary laser beam 68 so that cutter laser beam 66 is directed radially outward.

Laser cutter assembly 38 includes support ring 72. Support ring 72 is a ring shaped structural member located at a downhole end of fiber optic cable 70 within laser tool body 24 and centered around central axis 52. Support ring 72 can stabilize laser cutter assembly 38, prevent vibration of laser cutter assembly 38 to ensure a quality consistent and stable laser beam.

Cutter fiber optic cable 70 is one of the plurality of fiber optic cables of cable bundle 40. Cutter fiber optic cable 70 extends to support ring 72. Other of the fiber optic cables will continue past laser cutter assembly 38 to reach laser drilling head 28. Such other fiber optic cables are not shown in FIG. 6.

Laser cutter assembly 38 further includes cutter lens ring 80. Cutter lens ring 80 is a ring shaped structural member within laser tool body 24 and centered around central axis 52. Cutter optics 82 are mounted on cutter lens ring 80. Cutter optics 82 are used to shape and size primary laser beam 68. Cutter lens ring 80 is mounted on rails 84. Cutter lens ring 80 can slide along rails 84 to size, shape, and focus primary laser beam 68. The optics for laser cutter assembly 38 are designed to operate with a high powered laser beam with minimum power loss, no reflection, and no heating. As an example, fused quartz can be used to form the optics for laser cutter assembly 38.

Laser cutter assembly 38 further includes cutter rotation coupling 76. Cutter rotation coupling 76 provides for rotation of cutter head 64 about central axis 52 of laser tool body 24. Cutter head 64 can rotate in either or both of a clockwise or counter clockwise direction around central axis 52.

As cutter head 64 is rotated about central axis 52 of laser tool body 24, cutter head 64 will direct cutter laser beam 66 to form cuts in a circumferential pattern along a component 18, casing 16, or other internal surface of subterranean well 10. If laser system 22 is being moved longitudinally within wellbore 12 as cutter head 64 is rotated about central axis 52 of laser tool body 24, cutter head 64 will direct cutter laser beam 66 to form cuts in a helical pattern along a component 18, casing 16, or other internal surface of subterranean well 10.

In certain embodiments, as shown in FIG. 4, packer 78 is located radially exterior of laser tool body 24. Packer 78 is selectively extendable to position and stabilize laser tool body 24 within the subterranean well 10. Packer 78 can be used to stabilize laser tool body 24 while laser tool body 24 is stationary or while laser tool body 24 is moving axially within wellbore 12. Packer 78 can be any type of packer capable of expanding downhole. Multiple packers 78 can be arranged at regular intervals along the length of the laser tool body 24 or delivery member 26, or along both laser tool body 24 and delivery member 26. The total number of packers 78 can be determined by the length of wellbore 12. In at least one embodiment, packer 78 is expanded by a means controlled at the surface.

In an example of operation, when cutting of a component 18, casing 16, or other internal surface of subterranean well 10 is desired, laser system 22 can be lowered into subterranean well 10 on delivery member 26, as shown in FIG. 1. Depending on the target to be cut and removed from wellbore 12, one or more of laser drilling head 28, laser scanner assembly 36, and laser cutter assembly 38 can be used to cut the target.

Looking at FIG. 4, logging tool 32 can be used to determine when laser drilling head 28 of laser system 22 is approaching component 18. Orientation member 30 can be used to ensure that laser drilling head 28 of laser system 22 is properly oriented within wellbore 12 relative to component 18. Laser drilling head 28 can then direct head laser beam 42 beam towards component 18 so that component 18 is cut, chipped, melted, or vaporized by head laser beam 42. Laser drilling head 28 can continue to direct head laser beam 28 towards component 18 until any remaining pieces of component 18 are sufficiently small to be flushed out of wellbore 12 by fluid circulation within wellbore 12.

In alternate embodiments, one or both of laser scanner assembly 36 and laser cutter assembly 38 can be used to cut casing 16. Logging tool 32 can be used to determine when laser scanner assembly 36 of laser system 22 is approaching the target region of casing 16. Orientation member 30 can be used to ensure that laser scanner assembly 36 of laser system 22 is properly oriented within wellbore 12 relative to target region along casing 16.

Laser scanner assembly 36 can first be used to direct scanner laser beam 48 radially outwards. Movement of scanner head 46 along axial support 54 or the rotation of scanner head 46 in the axial direction, or both movement of scanner head 46 along axial support 54 and the rotation of scanner head 46 in the axial direction, will allow laser scanner assembly 36 to make axial cuts into a component 18, casing 16, or other internal surface of subterranean well 10.

Alternately, scanner head 46 can be rotated about central axis 52 of laser tool body 24, while scanner head 46 also moves axially along axial support 54, or rotates in the axial direction, or both. Such combined rotation and axial movement will allow laser scanner assembly 36 to make zigzag cuts into a component 18, casing 16, or other internal surface of subterranean well 10. A schematic representation of an example zigzag pattern 86 is shown in FIG. 7A. FIG. 7B is a schematic representation of such zigzag pattern 86 cut into casing 16. Zigzag pattern 86 can be cut into casing 16 as laser scanner assembly 36 is moved axially within wellbore 12 so that zigzag pattern 86 spirals around an inner diameter surface of casing 16.

Looking at FIG. 4, in alternate embodiments, logging tool 32 can be used to determine when laser cutter assembly 38 of laser system 22 is approaching the target region of casing 16. Orientation member 30 can be used to ensure that laser cutter assembly 38 of laser system 22 is properly oriented within wellbore 12 relative to target region along casing 16.

Laser cutter assembly 38 can be used in conjunction with or separately from laser scanner assembly 36. As cutter head 64 is rotated about central axis 52 of laser tool body 24, cutter head 64 will direct cutter laser beam 66 to form cuts in a circumferential pattern along a component 18, casing 16, or other internal surface of subterranean well 10. If laser system 22 is moved longitudinally within wellbore 12 as cutter head 64 is rotated about central axis 52 of laser tool body 24, cutter head 64 will direct cutter laser beam 66 to form cuts in a helical pattern along a component 18, casing 16, or other internal surface of subterranean well 10.

A schematic representation of an example helical pattern 88 is shown in FIG. 8A. FIG. 8B is a schematic representation of such helical pattern 88 cut into casing 16. Helical pattern 88 can be cut into casing 16 as laser cutter assembly 38 is moved axially within wellbore 12 so that helical pattern 88 spirals around an inner diameter surface of casing 16.

Laser cutter assembly 38 can makes cuts in casing 16 in the same region that was previous cut by laser scanner assembly. The combination of helical pattern 88 being cut over zigzag pattern 86 will result in the target section of casing 16 being cut into small pieces. Looking at FIG. 9A a schematic representation of example helical pattern 88 superimposed on zigzag pattern is shown. FIG. 9B is a schematic representation of such helical pattern 88 superimposed on zigzag pattern and cut into casing 16. The resulting pieces are sufficiently small to be flushed out of wellbore 12 by fluid circulation within wellbore 12.

Embodiments of this disclosure therefore provide systems and method for milling, cutting and drilling materials in a subterranean well. Laser energy is generated by a generator at the surface and the beam is delivered by way of fiber optics cable to the tool, the beam is manipulated at the laser tool which combines mechanical and optical parts to reconfigure the beam in any shape and size. The combination of the mechanical and optics parts and able to create different laser beam shapes and patterns, utilizing this properties, the proposed solution to mill, cut and drill the pipe and stuck objects by combing these patterns to breakdown the material is very small pieces and remove them from the wellbore.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A laser system for cutting objects within a subterranean well having a longitudinal axis, the laser system having:
a laser generator;
a cable bundle having an uphole end in communication with a primary laser beam generated by the laser generator;
a laser drilling head located at a terminal downhole end of a laser tool body, the laser drilling head operable to direct a head laser beam in a direction downhole of the laser tool body;
a laser scanner assembly located within the laser tool body uphole of the laser drilling head, the laser scanner assembly having a scanner head with a reflective surface that forms a scanner laser beam when the reflective surface is in a path of a portion of the primary laser beam, the scanner head being pivotable and rotatable around a central axis of the laser tool body;
scanner fiber optic cables that extend from the cable bundle;
a support plate coupled with ends of the scanner fiber optic cables distal from the cable bundle,
optics in the support plate that redirect a portion of the primary laser beam to the scanner head; and
a laser cutter assembly located within the laser tool body uphole of the laser drilling head, the laser cutter assembly having a cutter head operable to direct a cutter laser beam and to rotate around the central axis of the laser tool body, so that when the laser scanner assembly and laser cutter assembly are pulled upward inside the well, the pivoting and rotating of the scanner head in the laser scanner assembly forms a series of vertical cuts through a tubular that lines the well and rotation of the laser cutter assembly forms a helical cut through the tubular that intersects the vertical cuts to transform the tubular into pieces that are removable from the well.

2. The laser system of claim 1, where the laser scanner assembly includes an axial support having an end coupled with the support plate and the scanner head mounted onto the axial support at a location spaced axially away from the support plate, where the scanner head is axially moveable along the axial support towards and away from the support plate.

3. The laser system of claim 2, where the scanner head comprises a pair of scanner heads each having reflective surfaces that face away from one another, the laser scanner assembly further comprising a scanner rotation coupling for rotating the scanner heads about the central axis.

4. The laser system of claim 1, where the laser scanner assembly is operable to direct the scanner laser beam in a zigzag pattern along an internal surface of the subterranean well.

5. The laser system of claim 1, where the laser cutter assembly includes a disk-like support ring that is coaxial with the central axis and that includes an axial passage radially offset from the central axis that receives one of a plurality of fiber optic cables in which a portion of the primary laser beam is being transmitted to the cutter head.

6. The laser system of claim 5, where the one of the plurality of fiber optic cables extends from the support ring to a cutter lens ring spaced axially away from the support ring, the cutter lens ring having cutter optics for shaping and sizing the primary laser beam to form the cutter laser beam and to direct the cutter laser beam from the one of the plurality of fiber optic cables.

7. The laser system of claim 1, where the laser cutter assembly is operable to direct the cutter laser beam in a circumferential pattern along an internal surface of the subterranean well.

8. The laser system of claim 1, where the laser cutter assembly is operable to direct the cutter laser beam in a helical pattern along an internal surface of the subterranean well as the laser tool body is moved longitudinally within the wellbore.

9. The laser system of claim 1, where the system further includes an orientation member, the orientation member operable to confirm the orientation of the laser system within the subterranean well.

10. The laser system of claim 1, where the system further includes a logging tool, the logging tool operable to confirm the axial location of the laser tool body within the subterranean well.

11. The laser system of claim 1, where the system further includes a joint located uphole of the laser drilling head, and downhole of both the laser scanner assembly and the laser cutter assembly.

12. The laser system of claim 1, where the system further includes a packer located radially exterior of the laser tool body, the packer selectively extendable to position the laser tool body within the subterranean well.

13. A method for cutting objects within a subterranean well having a longitudinal axis and that is lined with a tubular, the method including:
lowering a laser system into the subterranean well, the laser system having:
a laser drilling head located at a terminal downhole end of a laser tool body;
a laser scanner assembly located within the laser tool body uphole of the laser drilling head;
a laser cutter assembly located within the laser tool body uphole of the laser drilling head; and
a cable bundle formed of a plurality of fiber optic cables extending from an uphole end of the laser tool body, some of the plurality of fiber optic cables extending to the laser drilling head, some of the plurality of fiber optic cables extending to the laser scanner assembly to define scanner fiber optic cables, and some of the plurality of fiber optic cables extending to the laser cutter assembly to define cutting fiber optic cables;
directing a head laser beam in a direction downhole of the laser tool body with the laser drilling head;
supporting some of the cutter fiber optic cables with a support ring that is coaxial with a central axis of the laser tool body, the support ring having axial passages that are radially offset from the central axis of the laser tool body and in which the fiber optic cables are supported;
forming vertical cuts into the tubular by directing a scanner laser beam with a scanner head of the laser scanner assembly, the laser scanner assembly moveable both axially along a length of the laser tool body and rotationally around theft central axis of the laser tool body; and
cutting the tubular into pieces for removal from the well by directing a cutter laser beam with a cutter head of the laser cutter assembly, the laser cutter assembly rotatable around the central axis of the laser tool body.

14. The method of claim 13, further comprising shaping a portion of the primary laser beam with cutter optics in a cutter lens ring spaced axially away from the support ring, and where the laser scanner assembly includes an axial support, and where the method further includes moving the scanner head along the axial support.

15. The method of claim 14, where the scanner head rotates relative to the axial support.

16. The method of claim 13, where the scanner fiber optic cables and the cutter fiber optic cables are spaced radially outward from the central axis.

17. The method of claim 13, where the laser cutter assembly includes a support ring, and where the method further includes extending one of the plurality of fiber optic cables from the cable bundle, to the support ring.

18. The method of claim 13, where the laser cutter assembly includes a cutter lens, and where the method further includes directing the cutter laser beam from one of the plurality of fiber optic cables with the cutter lens.

19. The method of claim 13, where the laser cutter assembly directs the cutter laser beam in a circumferential pattern along an internal surface of the subterranean well.

20. The method of claim 13, where the laser cutter assembly directs the cutter laser beam in a helical pattern along an internal surface of the subterranean well as the laser tool body is moved longitudinally within the wellbore.

21. The method of claim 13, where the laser system further includes an orientation member, and where the method further includes confirming the orientation of the laser system within the subterranean well with the orientation member.

22. The method of claim 13, where the laser system further includes a logging tool, and where the method further includes confirming the axial location of the laser tool body within the subterranean well with the logging tool.

23. The method of claim 13, where the laser system further includes a joint located uphole of the laser drilling head, and downhole of both the laser scanner assembly and the laser cutter assembly.

24. The method of claim 13, where the laser system further includes a packer located radially exterior of the laser tool body, and where the method further includes extending the packer to position the laser tool body within the subterranean well.

* * * * *

UNITED STATES PATENT AND TRADEMARK OFFICE
CERTIFICATE OF CORRECTION

| | | |
|---|---|---|
| PATENT NO. | : 11,821,276 B2 | Page 1 of 1 |
| APPLICATION NO. | : 17/530162 | |
| DATED | : November 21, 2023 | |
| INVENTOR(S) | : Sameeh Batarseh | |

It is certified that error appears in the above-identified patent and that said Letters Patent is hereby corrected as shown below:

In the Claims

Column 12, Claim 13, Line 25:
"theft"
Should be changed to:
"the"

Signed and Sealed this
Twentieth Day of February, 2024

*Katherine Kelly Vidal*

Katherine Kelly Vidal
*Director of the United States Patent and Trademark Office*